(12) United States Patent
Shelley (10) Patent No.: US 9,423,790 B2
(45) Date of Patent: Aug. 23, 2016

(54) APPARATUS AND METHOD FOR SELF-TUNING A PROCESSING SYSTEM

(75) Inventor: Gerald Robin Shelley, Uckfield (GB)

(73) Assignee: Edwards Limited, Crawley, West Sussex (GB)

( * ) Notice: Subject to any disclaimer, the term of this patent is extended or adjusted under 35 U.S.C. 154(b) by 546 days.

(21) Appl. No.: 14/112,106

(22) PCT Filed: Mar. 14, 2012

(86) PCT No.: PCT/GB2012/050553
§ 371 (c)(1),
(2), (4) Date: Oct. 16, 2013

(87) PCT Pub. No.: WO2012/146906
PCT Pub. Date: Nov. 1, 2012

(65) Prior Publication Data
US 2014/0039655 A1  Feb. 6, 2014

(30) Foreign Application Priority Data

Apr. 27, 2011 (GB) .................................. 1107057.0

(51) Int. Cl.
*G05B 19/418* (2006.01)
*H02P 1/04* (2006.01)

(52) U.S. Cl.
CPC ............ *G05B 19/41865* (2013.01); *H02P 1/04* (2013.01); *G05B 2219/45031* (2013.01); *Y02P 90/20* (2015.11)

(58) Field of Classification Search
CPC ............... G05B 19/41865; G05B 2219/45031; H02P 1/04; Y02P 90/20
See application file for complete search history.

(56) References Cited

U.S. PATENT DOCUMENTS

2002/0070691 A1* 6/2002 Park .................... G06F 1/3203
                                                     315/406
2003/0219342 A1  11/2003 Curry et al.
(Continued)

FOREIGN PATENT DOCUMENTS

CN   101034285 A   9/2007
CN   101727599 A   6/2010
(Continued)

OTHER PUBLICATIONS

Office Action dated Mar. 30, 2015 for corresponding Chinese Application No. 201280020260.4.
(Continued)

*Primary Examiner* — M. N. Von Buhr
(74) *Attorney, Agent, or Firm* — Westman, Champlin & Koehler, P.A.; Theodore M. Magee (57) ABSTRACT

A method and apparatus is disclosed for automatically adjusting a recovery time for a processing system to recover from an idle mode to a normal operation mode in order to improve the efficiency of resource utilization, such as energy consumption. The processing system can be one that is used in semiconductor manufacturing, and include a process tool supported by an auxiliary device, such as a vacuum pump or abatement device. A number of parameters can be controlled to adjust the recovery time of the auxiliary device. One or more of those parameters can be increased or decreased based on comparison between a measured, actual recovery time and a predetermined, target recovery time, at the end of each recovery cycle. As such, the actual, measured recovery time can gradually converge with the predetermined, target recovery time, thereby optimizing the resource utilization of the processing system.

18 Claims, 4 Drawing Sheets

(56) References Cited

U.S. PATENT DOCUMENTS

2008/0282710 A1    11/2008  Bartlett et al.
2009/0222128 A1*   9/2009   Clark .................. G05B 19/418
                                                              700/159

FOREIGN PATENT DOCUMENTS

| JP | 200036283 | | 2/2000 | |
| JP | 2003097428 A | | 4/2003 | |
| JP | 2007242854 A | * | 9/2007 | .............. H01L 21/02 |
| KR | 20070087140 A | | 7/2007 | |
| KR | 20070092148 A | * | 9/2007 | ....... G05B 19/41865 |
| KR | 20100137237 A | | 6/2009 | |
| WO | 03100259 A1 | | 12/2003 | |
| WO | 2004025701 A2 | | 3/2004 | |

OTHER PUBLICATIONS

Office Action and Search Report for ROC (Taiwan) Patent Application No. 101111546 dated Apr. 15, 2016, 3pgs.
International Search Report dated Jul. 5, 2012 for corresponding International Application No. PCT/GB2012/050553, filed Mar. 14, 2012.
International Written Opinion of the International Searching Authority dated Jul. 5, 2013 for corresponding International Application No. PCT/GB2012/050553, filed Mar. 14, 2012.
United Kingdom Search Report dated Aug. 26, 2011 of Application No. GB1107057.0, filed Apr. 24, 2011.

* cited by examiner

APPARATUS AND METHOD FOR SELF-TUNING A PROCESSING SYSTEM

CROSS-REFERENCE TO RELATED APPLICATION

This Application is a Section 371 National Stage Application of International Application No. PCT/GB2012/050553, filed Mar. 14, 2012, which is incorporated by reference in its entirety and published as WO 2012/146906 A1 on Nov. 1, 2012 and which claims priority to British Application No. 1107057.0, filed Apr. 27, 2011.

BACKGROUND

The present disclosure relates generally to an apparatus and method for self-tuning a processing system in order to improve the efficiency of resource utilization, such as energy consumption, of the processing system.

A processing system used in manufacturing semiconductor devices typically includes, among other things, a process tool, vacuum pump, and abatement device. The process tool provides a process chamber in which a semiconductor wafer is processed into a predetermined structure. For example, a chemical vapor deposition can be performed to form an oxide layer on the semiconductor wafer in the process chamber. In another example, the process tool can include a process chamber in which the oxide layer is further etched into a predetermined pattern. In operation, the process chamber needs to be in a vacuum condition to ensure that the semiconductor process steps are not compromised by the presence of unwanted chemicals or impurities.

The vacuum pump is used to evacuate the process chamber to bring it to a desired vacuum condition. Depending on process requirements, one or more vacuum pumps can be selectively connected in series. For example, a booster pump and a backing pump that operate at different pressure levels can be connected in series to achieve a desired pumping performance. Regardless of the number of vacuum pumps being used, an inlet of the pump or assembly of pumps is connected to the process chamber, such that gases can be evacuated from the process chamber.

In a typical processing system, an outlet of the pump or assembly of pumps can be connected to an abatement device, which treats the hazardous exhaust gases evacuated from the process chamber before releasing them to the environment. For example, the abatement device can be a wet scrubber that uses water to absorb gaseous ammonia evacuated from the process chamber in a metalorganic chemical vapor deposition process. In another example, the abatement device can be a combustion-based apparatus in which the gaseous ammonia is decomposed by reacting with gaseous hydrogen.

It is desired to manage and reduce the resources, such as electric power, fuel, and water, consumed by the vacuum pump and abatement device during the semiconductor manufacturing processes. The power consumed by the vacuum pumps and abatement devices represents a significant portion of the total power consumed by the processing systems in manufacturing semiconductor wafers. Many efforts have been made in the semiconductor industry to improve the efficiency of resource utilization of the vacuum pumps and abatement devices, in order to reduce the manufacturing costs of semiconductor wafers.

One conventional method for improving the resource utilization efficiency is to put the vacuum pump and abatement device in an idle mode, when the process tool does not require that the vacuum pump and abatement device operate in their normal capacity. For example, when semiconductor wafers are being transferred into or out of the process chamber, the vacuum pump and abatement device can be put in the idle mode, in which they consume fewer resources than they do in a normal operation, without affecting the throughput. When the process tool requires the vacuum pump and abatement device to operate in their normal capacity, they can be brought back to their normal operation mode from the idle mode. Thus, resource saving is achieved without compromising on the performance and throughput of the process tool.

The idle mode can be referred to as the sleep mode, green mode, hibernation, reduced/low power mode, by different people in various contexts. It is noted that in this disclosure, idle mode is used to refer to all these modes in the meaning as discussed above.

One drawback of the conventional method is its inability to accurately control the timing for the vacuum pump and/or abatement device to recover from the idle mode. For example, the recovery time for the temperature of the vacuum pump to increase from that at an idle speed to a normal speed can be longer than the notice period given by the process tool, thereby resulting in delays to the start of the process and underutilization of the process tool. Another drawback of the conventional method is its inflexibility to adapt to changing conditions of the process system. For example, in the conventional method, the recovery time of the vacuum pump is initially set at a predetermined value, which is close to the actual time needed for the vacuum pump to recover from the idle mode to the normal operation mode. However, after many cycles of operation, there might be a loss in performance of the vacuum system, and therefore the time needed for the vacuum pump to recover from the idle mode to the normal operation mode becomes longer than the initially set value. Since the conventional method cannot adapt to the changing conditions of the processing system, the preset recovery time might become inaccurate over time.

As such, what is needed is a method and apparatus for adjusting the recovery time of a processing system in accommodation with the changing conditions of the processing system to improve the resource utilization efficiency of the processing system.

The discussion above is merely provided for general background information and is not intended to be used as an aid in determining the scope of the claimed subject matter. The claimed subject matter is not limited to implementations that solve any or all disadvantages noted in the background.

SUMMARY

A method and apparatus for adjusting the recovery time of a processing system in accommodation with the changing conditions of the processing system to improve the resource utilization efficiency of the processing system. In some embodiments, the method includes setting a target recovery time, a target value of a first parameter at which the auxiliary device operates in the normal operation mode, and an initial idle value of a second parameter at which the auxiliary device operates at the idle mode; adjusting the second parameter from a normal value at which the auxiliary device operates in the normal operation mode to the initial idle value in response to an idle command; adjusting the second parameter from the initial idle value to the normal value in response to a recovery command; and adjusting the initial idle value based on a difference between a measured recovery time, defined as a time period for the first parameter to return from a value at which the auxiliary device operates in the idle mode to the target value, and the target recovery time.

The construction and method of operation of the invention, however, together with additional objectives and advantages thereof will be best understood from the following description of specific embodiments when read in connection with the accompanying drawings.

The Summary is provided to introduce a selection of concepts in a simplified form that are further described in the Detailed Description. This Summary is not intended to identify key features or essential features of the claimed subject matter, nor is it intended to be used as an aid in determining the scope of the claimed subject matter.

DETAILED DESCRIPTION

Embodiments described below are directed to a method and an apparatus for adjusting a recovery time for a processing system to recover from an idle mode to a normal operation mode in order to improve the efficiency of resource utilization. The processing system can be one that is used in semiconductor manufacturing, and include a process tool supported by an auxiliary device, such as a vacuum pump or abatement device. A number of parameters can be controlled to adjust the recovery time of the auxiliary device. One or more of those parameters can be increased or decreased based on comparison between a measured, actual recovery time and a predetermined, target recovery time, at the end of each recovery cycle. As such, the actual, measured recovery time can gradually converge with the predetermined, target recovery time, thereby optimizing the resource utilization of the processing system.

Figure 1:
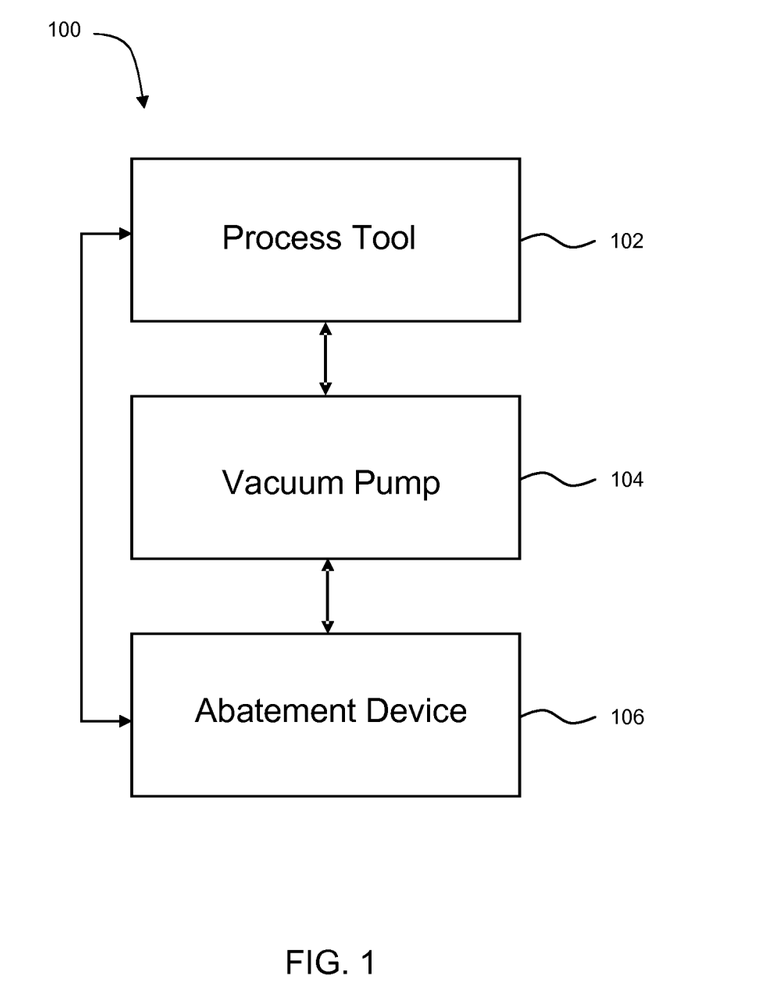
FIG. 1 illustrates a functional block diagram of a processing system in accordance with some embodiments.

FIG. 1 illustrates a processing system 100 in which the disclosed method and apparatus can be implemented in accordance with some embodiments of the invention. The processing system 100 includes a process tool 102 supported by an auxiliary device, which can be a vacuum pump 104, abatement device 106, or a combination thereof. The process tool 102 can include a process chamber, in which a semiconductor wafer can be placed and processed into desired structures. For example, the process tool 102 can perform a chemical vapor deposition process to form a thin layer of material on a semiconductor wafer in the process chamber. As another example, the process tool 102 can perform an etching process that etches the semiconductor wafer into certain patterns. Regardless of the functions of the process tool 102, it is not unusual for various gases to pass through the process chamber of the tool when it is in operation.

The vacuum pump 104 is fluidly connected to the process tool 102 for evacuating exhaust gases from the process chamber, and ensuring that the inner pressure of the process chamber is maintained at a desired level. The abatement device 106 is in fluid connection to the vacuum pump 104 for treating the effluent gases from the vacuum pump 104, such that toxic, hazardous, or pyrophoric substances in the effluent gases can be decomposed into less harmful and more environmentally friendly compounds before being released to the environment. In FIG. 1, the vacuum pump 104 is illustrated as being downstream of the process tool 102, and the abatement device 106 as being downstream of the vacuum pump 104. In alternative embodiments of the invention, the abatement device might be connected between the process tool and the vacuum pump, such that the vacuum pump would be placed downstream of the abatement device. In some other alternative embodiments, the abatement device might be omitted altogether.

The processing system 100 is configured to switch between a normal operation mode and idle mode. In the normal operation mode, the auxiliary device, such as the vacuum pump 104 and/or the abatement device 106, operates at its normal capacity in support of the process tool 102. When the process tool 102 can tolerate the auxiliary device running at a lower-than-normal capacity, the auxiliary device can be put in the idle mode in which it consumes less resource, such as electric power, gases and water, in response to an idle command that might be issued by the process tool 102. For example, in a transient period in which semiconductor wafers are moved into or out of the process chamber, the vacuum pump 104 can be set to an idle mode where the pumping speed is lower than a normal pumping speed, without compromising the throughput of the process tool 102. In the same transient period, the abatement device 106 can also be put in the idle mode in which it consumes less electric power, water and gas, again without compromising the throughput of the process tool 102. The idle mode can be triggered by the process tool 102 sending an idle command to the vacuum pump 104 and/or the abatement device 106. When it is desired to return the processing system 100 to the normal operation mode, the process tool 102 can issue a recovery command to the vacuum pump 104 and/or abatement device 106. Upon receiving the recovery command, the vacuum pump 104 and/or abatement device 106 adjust certain parameters from an idle level back to a normal level. The time required for the parameters to return from the idle level to the normal level is referred to as the "recovery time."

Figure 2:
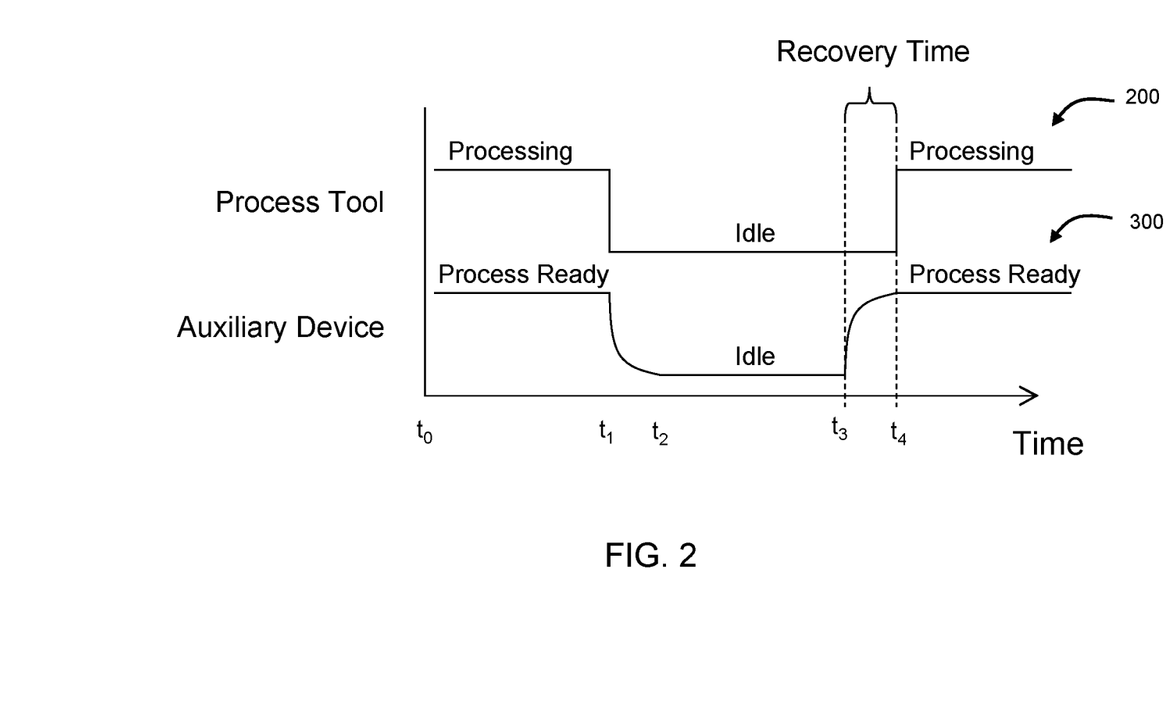
FIG. 2 illustrates a timing chart showing a processing system recovering from the idle mode to the normal operation mode in accordance with some embodiments.

FIG. 2 illustrates a timing chart showing a process in which a processing system recovers from the idle mode to the normal operation mode in accordance with some embodiments of the invention. The x-axis represents a time dimension. The y-axis represents the levels of power consumed by the process tool and auxiliary device. The timing graph 200 of the process tool is aligned with the timing graph 300 of the auxiliary device in the y-axis direction for comparing their behaviors at different times. It is noted that FIG. 2 should not be interpreted as if at any given moment, the process tool always consumes more power than the auxiliary device in a proposition seemingly suggested by the relative locations of the graphs 200 and 300 on the drawing.

As shown in the figure, the process tool is set to the idle mode at t1. As a result, the power consumption of the process tool drops from a higher level to a lower level. Upon receiving an idle command from the process tool, the auxiliary device starts entering the idle mode at t1. Due to the nature of the auxiliary device, it takes a time period from t1 to t2 for the auxiliary device to fully settle and stabilize from a higher level of power consumption in the normal operation mode to a lower level of power consumption in the idle mode. For example, in the case where the auxiliary device is a vacuum pump, it takes time for the vacuum pump to drop from a higher normal speed to a lower idle speed in the process of its adjusting from the normal operation mode to the idle mode. In anticipation of resuming to the normal operation mode, the process tool sends out a recovery command to the auxiliary device at t3. Upon receiving the recovery command, the auxiliary device starts resuming back to the normal operation mode at t3. Due to the nature of the auxiliary device, it takes a time period from t3 to t4 for the auxiliary device to fully settle and stabilize from a lower level of power consumption in the idle mode to a higher level of power consumption in the normal operation mode. The time period from t3 to t4 is referred to as the "recovery time."

In addition to power consumption, there are many parameters that can be used to define the idle mode and the normal operation mode. For example, temperature can be used to define the idle and normal operation modes in a manner that the auxiliary device is considered as in the normal operation mode if its temperature is higher than a predetermined level, whereas it is considered as in the idle mode if its temperature is lower than a predetermined level. As another example, the gas flow rate can also be used to define the idle and normal operation modes in a manner that the auxiliary device is considered as in the normal operation mode if its gas flow rate is higher than a predetermined value, whereas it is considered as in the idle mode if its gas flow rate is lower than a predetermined level. Those parameters apply not only in the idle mode, but also the normal operation mode.

Figure 3:
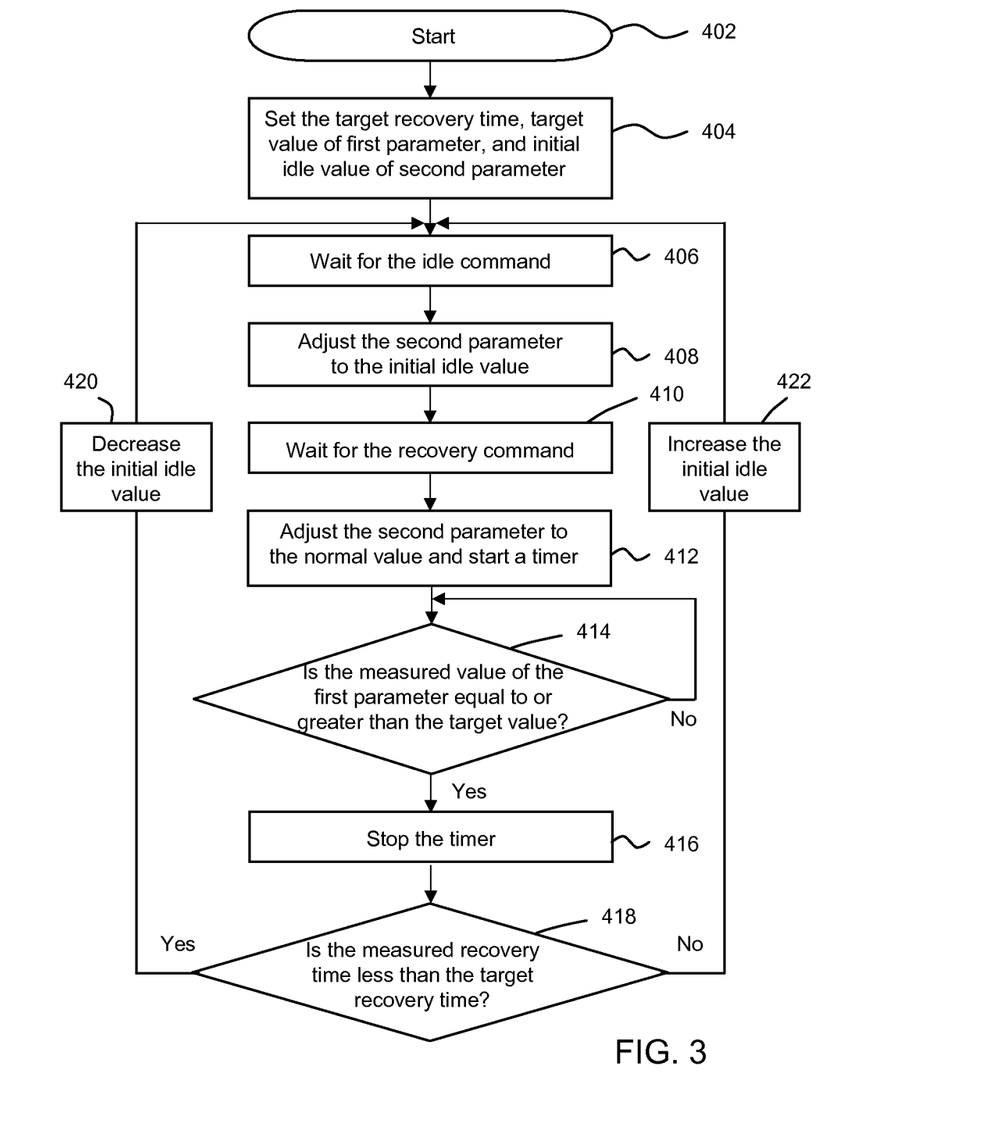
FIG. 3 illustrates a flowchart showing a method for self-tuning a recovery time of the processing system in accordance with some embodiments.

FIG. 3 illustrates a flowchart showing a method for self-tuning a recovery time of the processing system in accordance with some embodiments of the invention. The method starts at step 402. A target recovery time, target value of a first parameter, and an initial idle value of a second parameter are set at step 404. The target recovery time is a projected value as oppose to the actual recovery time the processing system takes to recover from the idle mode to the normal operation mode. The target value of the first parameter is a predetermined value at which the first parameter should be when the processing system is in the normal operation mode. For example, the first parameter can be a temperature of a vacuum pump in fluid connection to a process chamber, and the target value can be a temperature at or above which the vacuum pump is considered as operating in the normal operation mode. The second parameter is a controlled variable, which is adjusted to switch the auxiliary device between the idle mode and the normal operation mode. When the auxiliary device is put in the idle mode, the second parameter is adjusted to be at the initial idle value. For example, the second parameter can be a pump speed of a vacuum pump in fluid connection with the process chamber, and the initial idle value is the initial idle speed the vacuum pump is adjusted to when it is put in the idle mode.

At step 406, the auxiliary device waits for an idle command issued by the process tool, or any other control devices or computers. Upon receiving the idle command, the second parameter of the auxiliary device is adjusted from its current value in the normal operation mode to the initial idle value in the idle mode, at step 408. In most situations, the initial idle value is lower than the normal value of the second parameter when the auxiliary device is in the normal operation mode, such that the resources consumed by the auxiliary device can be reduced in the idle mode. For example where the auxiliary device is a vacuum pump and the second parameter is the pump speed, the initial idle value can be only a fraction of the normal value, such that adjusting the vacuum pump from the normal value to the initial idle value results in significant energy saving. In a typical manufacturing process of 300 mm semiconductor wafers, the resulted energy saving can reach approximately 26% of the total energy consumption without the idle mode.

At step 410, the auxiliary device waits for a recovery command issued by the process tool, or any other control devices or computers. Upon receiving the recovery command, the second parameter of the auxiliary device starts adjusting back from the initial idle value to a predetermined normal value, and a timer is started to measure the time needed for the auxiliary device to move from the idle mode back to the normal operation mode, at step 412. At step 414, a determination of whether a measured value of the first parameter is equal to or greater than the target value is made. If the determination is negative, the process goes back to the beginning of step 414. If the determination is positive, the process proceeds to step 416, where the timer is stopped. As discussed above, the first parameter is an indicator of whether the auxiliary device is in the idle mode or normal operation mode. For example, the first parameter can be a temperature of vacuum pump, whose value indicating whether the vacuum pump is in the idle or normal operation mode.

In some alternative embodiments of the invention, it is possible for the value of the first parameter to be higher in the idle mode than that in the normal operation mode. For example, in case where the first parameter is the gas pressure of the process chamber, the pressure level in the idle mode would be higher than that in the normal operation mode, as the pump speed is reduced in the idle mode. In such case, step 414 can be modified by comparing the measured value of the first parameter to the target value of the first parameter to determine whether the measured value is equal to or smaller than the target value. If the determination is negative, the process goes back to the beginning of step 414. If the determination is positive, the process proceeds to step 416.

At step 418, a determination of whether the recovery time measured by the timer is less than the target recovery time is made. If the measured recovery time is less than the target recovery time, the initial idle value of the second parameter is decreased by a predetermined decrement at step 420. This enables the auxiliary device to achieve more resource saving. For example, assuming the target recovery time of a vacuum pump in fluid connection with a process tool is 10 minutes, a measured recovery time of 5 minutes means that the vacuum pump would run at the normal speed for another 5 minutes before the process tool is ready for normal operation, thereby causing a waste of energy. By decreasing the initial idle speed, the actual recovery time can be prolonged to be more in line with the target recovery time, thereby resulting in more energy saving.

If the measured recovery time is no less than the target recovery time, the initial idle value of the second parameter is increased by a predetermined increment at step 422. This avoids the situation that when the process tool is ready for normal operation, the auxiliary device is not yet recovered from the idle mode.

In some other alternative embodiments of the invention, it is possible for the value of the second parameter to be higher in the idle mode than that in the normal operation mode. For example, the second parameter can be the gas pressure in the process chamber where in the idle mode, the pressure level of the process chamber is increased towards the atmospheric level. In such case, if the measured recovery time is less than the target recovery time at step 418, the process proceeds to step 422, instead of step 420 as discussed in the embodiments above. If the measured recovery time is greater than the target recover time at step 418, the process proceeds to step 420, instead of step 422 as discussed in the embodiments above.

Figure 4:
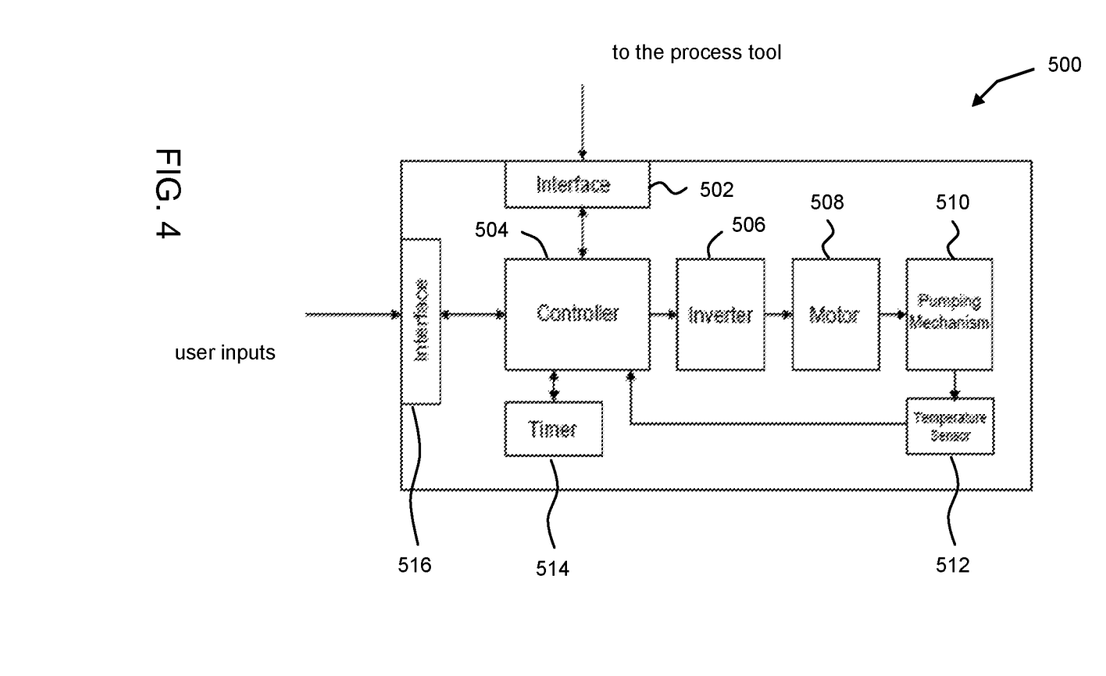
FIG. 4 illustrates a functional block diagram showing an exemplary apparatus implementing the self-tuning method in accordance with some embodiments.

FIG. 4 illustrates a functional block diagram showing an exemplary apparatus implementing the self-tuning method in accordance with some embodiments of the invention. The auxiliary device in the example is a vacuum pump 500, which receives an idle command or recovery command from a process tool (not shown in the figure) electrically connected to an interface 502. The commands are provided to a controller 504, which is electrically connected to an inverter 506, which is further connected to a motor 508. The motor 508 drives a pumping mechanism 510, which includes at least a rotor and a stator, for evacuating gases from a process chamber of the process tool. A temperature sensor 512 is located on or at the pumping mechanism for measuring the temperature of the pumping mechanism 510. The temperature sensor 512 generates a signal indicating the measured value of the temperature and sends the signal to the controller 504. A timer 514 is controlled by the controller 504 to measure the recovery time of the vacuum pump 500.

Initially, a user may set the target recovery time, target temperature, and initial idle speed by providing user inputs to an interface 516. Upon receiving an idle command from the process tool via the interface 502, the controller 504 controls the inverter 506 to adjust the rotational speed of the motor 508, which in turn adjusts the pump speed of the pumping mechanism 510 from the normal value to the initial idle speed. Thereafter, upon receiving a recovery command from the process tool, the controller 504 starts the timer 514 and controls the inverter 506 to adjust the rotational speed of the motor 508, which in turn adjusts the pump speed of the pumping mechanism 510 from the initial idle speed to the normal value. The temperature sensor 512 continuously monitors the temperature of the pumping mechanism 510, and provides a signal indicating the measured temperature of the pumping mechanism 510 to the controller 504. If the controller 504 determines that the measured temperature is equal to or greater than the target temperature, it stops the timer 514 and calculates the measured recovery time. The controller 504 compares the measured recovery time with the target recovery time, and adjusts the value of the initial idle speed based on the comparison, such that the efficiency of resource utilization can be improved in the next recovery cycle.

One of the advantages of the invention is that the disclosed method and apparatus enables a processing system to adapt to its changing conditions and environments in optimization of its resource utilization efficiency. The ability of the processing system to self adjust the initial idle value of certain parameters based on actual historical data ensures that the idle settings keep up with process variations. For example, in a processing system where a vacuum pump is used to evacuate a process tool, particulates might build up in the vacuum pump, and therefore change its characteristics. Alternatively the purge gas temperature may rise, reducing the recovery time to normal operating temperature. As a result, the initial idle settings, without adjustments, might become inaccurate or inefficient in managing the idle mode of the vacuum pump over time. The disclosed method and apparatus help eliminate the inaccuracy and inefficiency.

The above illustration provides many different embodiments or embodiments for implementing different features of the invention. Specific embodiments of components and processes are described to help clarify the invention. These are, of course, merely embodiments and are not intended to limit the invention from that described in the claims. For example, besides controlling auxiliary devices, such as vacuum pumps and abatement devices, the disclosed method can be used to control thermal management systems, such as the heaters and cooling mechanisms fitted into the vacuum pumps and/or the pipework of the processing system. It is understood that applying the disclosed method in controlling the thermal management systems is also within the scope of the invention.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for adjusting a recovery time for a processing system having a process tool and an auxiliary device to recover from an idle mode to a normal operation mode, comprising:
   setting a target recovery time, a target value of a first parameter at which the auxiliary device operates in the normal operation mode, and an initial idle value of a second parameter at which the auxiliary device operates at the idle mode;
   adjusting the second parameter from a normal value at which the auxiliary device operates in the normal operation mode to the initial idle value in response to an idle command;
   adjusting the second parameter from the initial idle value to the normal value in response to a recovery command; and
   adjusting the initial idle value based on a difference between a measured recovery time, defined as a time period for the first parameter to return from a value at which the auxiliary device operates in the idle mode to the target value, and the target recovery time.

2. The method of claim 1 wherein the adjusting the initial idle value comprises decreasing the initial idle value if the measured recovery time is less than the target recovery time and the second parameter is supposed to have a lower value in the idle mode than in the normal operation mode.

3. The method of claim 2 wherein the adjusting the initial idle value comprises increasing the initial idle value if the measured recovery time is no less than the target recovery time and the second parameter is supposed to have a lower value in the idle mode than in the normal operation mode.

4. The method of claim 3 wherein the auxiliary device is a vacuum pump or an abatement device.

5. The method of claim 4 wherein the first parameter is a temperature or gas flow rate of the vacuum pump.

6. The method of claim 5 wherein the second parameter is a pump speed of the vacuum pump.

7. The method of claim 4 wherein the first parameter is a gas flow rate of the abatement device.

8. The method of claim 7 wherein the second parameter is an electric power supplied to the abatement device.

9. The method of claim 1 wherein the adjusting the initial idle value comprises increasing the initial idle value if the measured recovery time is less than the target recovery time and the second parameter is supposed to have a higher value in the idle mode than in the normal operation mode.

10. The method of claim 9 wherein the adjusting the initial idle value comprises decreasing the initial idle value if the measured recovery time is no less than the target recovery time and the second parameter is supposed to have a higher value in the idle mode than in the normal operation mode.

11. The method of claim 10 wherein the auxiliary device is a vacuum pump or an abatement device.

12. The method of claim 11 wherein the first parameter is a temperature or gas flow rate of the vacuum pump.

13. The method of claim 12 wherein the second parameter is a gas pressure in the process tool.

14. An apparatus for adjusting a recovery time for a processing system having a process tool and a vacuum pump to recover from an idle mode to a normal operation mode, comprising:
- a pumping mechanism having a rotor and a stator for evacuating a gas from a process chamber of the process tool;
- a motor for driving the rotor of the pumping mechanism; and
- a controller configured for carrying out following steps:
  - setting a target recovery time, a target value of a parameter at which the vacuum pump operates in the normal operation mode, and an initial idle speed at which the vacuum pump operates in the idle mode;
  - adjusting a rotational speed of the motor from a normal speed to the initial idle speed in response to an idle command;
  - adjusting the rotational speed of the motor from the initial idle speed to the normal speed in response to a recovery command; and
  - adjusting the initial idle speed based on a difference between a measured recovery time, defined as a period for the first parameter returns from an idle value at which the vacuum pump operates in the idle mode to the target value, and the target recovery time.

15. The apparatus of claim 14 wherein the first parameter is a temperature of the pumping mechanism, or a flow rate at which the gas passes through the pumping mechanism.

16. The apparatus of claim 14 wherein the second parameter is a pump speed or a gas pressure in the process tool.

17. The apparatus of claim 14 further comprising a sensor in contact with the pumping mechanism for measuring the first parameter and providing the controller with a signal indicating a measured value of the first parameter.

18. The apparatus of claim 14 further comprising a timer for providing the controller with the measured recovery time.

* * * * *